United States Patent [19]

Braunschweiler

[11] Patent Number: 5,044,219
[45] Date of Patent: Sep. 3, 1991

[54] VARIABLE RADIUS SEGMENT GEAR IN THE FORM OF A CIRCULAR ARC AND A GEAR MECHANISM FOR SUCH GEAR

[76] Inventor: Hans G. Braunschweiler, Nidelbadstrasse 80, CH-8803 Ruschlikon, Switzerland

[21] Appl. No.: 520,806

[22] Filed: May 9, 1990

[30] Foreign Application Priority Data

May 10, 1989 [CH] Switzerland ............ 1754/89

[51] Int. Cl.$^5$ ............................................. F16H 55/30
[52] U.S. Cl. .................................................. 74/448
[58] Field of Search ................ 74/448, 395, 397, 448, 74/393

[56] References Cited

U.S. PATENT DOCUMENTS 3,889,548  6/1975  Tobey et al. ............... 74/395
3,996,814 12/1976  Westlake ..................... 74/243
4,449,425  5/1984  Carden ..................... 74/448 X
4,843,899  7/1989  Braunschweiler ............. 74/84

FOREIGN PATENT DOCUMENTS

0248289    5/1987  European Pat. Off. .
2619184    2/1989  France .
954332     4/1964  United Kingdom .
2135743A   9/1984  United Kingdom .
WO88/03624 5/1988  World Int. Prop. O. .

Primary Examiner—Richard E. Moore
Attorney, Agent, or Firm—Finnegan, Henderson, Farabow, Garrett & Dunner

[57] ABSTRACT

A variable radius segment gear in the form of a circular arc having individual tooth elements arranged in succession with each carrying at least one gear tooth. The elements are held together by at least one tensioned, flexible coupling element strong in tension which describes a circular arc and is anchored at each of its ends in an endpiece. Adjusting structure is provided in order to alter the distance of the endpieces from the center Z of the circular arc and hence the radius of the segment gear.

14 Claims, 6 Drawing Sheets

VARIABLE RADIUS SEGMENT GEAR IN THE FORM OF A CIRCULAR ARC AND A GEAR MECHANISM FOR SUCH GEAR

BACKGROUND OF THE INVENTION

The present invention relates to a variable radius segment gear in the form of a circular arc and to a gear mechanism for such a segment gear.

A segment gear in the form of a circular arc corresponds to part of the circumference of an internally or externally toothed spur gear. The transmission ratio between such a segment gear and a gear meshing with the latter is constant or can only be varied within very narrow limits. Variation is possible if the segment gear and the gear are caused to orbit relative to one another around an orbiting axis and the distance between the position of engagement between the segment and the gear on the one hand and the orbiting axis on the other hand is altered. However, in known segment gears of the type mentioned at the outset, this distance alteration can only be performed within very narrow limits, within which the orbiting axis is still close to the center of the circular arc.

It is therefore an object of the invention to create a segment gear in which the radius of curvature of the circular arc can be altered within comparatively wide limits.

SUMMARY OF THE INVENTION

This object is achieved according to the present invention, by providing a variable radius segment gear comprising a plurality of individual tooth elements arranged in succession each carrying at least one gear tooth and at least one tensioned, flexible coupling element holding together said elements in a circular arc and being anchored at each of its ends in an endpiece, and adjusting means for altering the distance of the endpieces from the center of the circular arc and hence the radius of the segment gear.

Due to the fact that the toothing of the segment gear is divided up into the tooth elements which are held together by the flexible coupling element tensioned between the endpieces, the arc length described by the segment gear remains constant but its radius of curvature can be altered or varied within comparatively wide limits.

BRIEF DESCRIPTION OF THE DRAWINGS

Illustrative embodiments of the invention are described in greater detail below with reference to the drawings, in which.

DETAILED DESCRIPTION OF THE INVENTION

Figure 1:
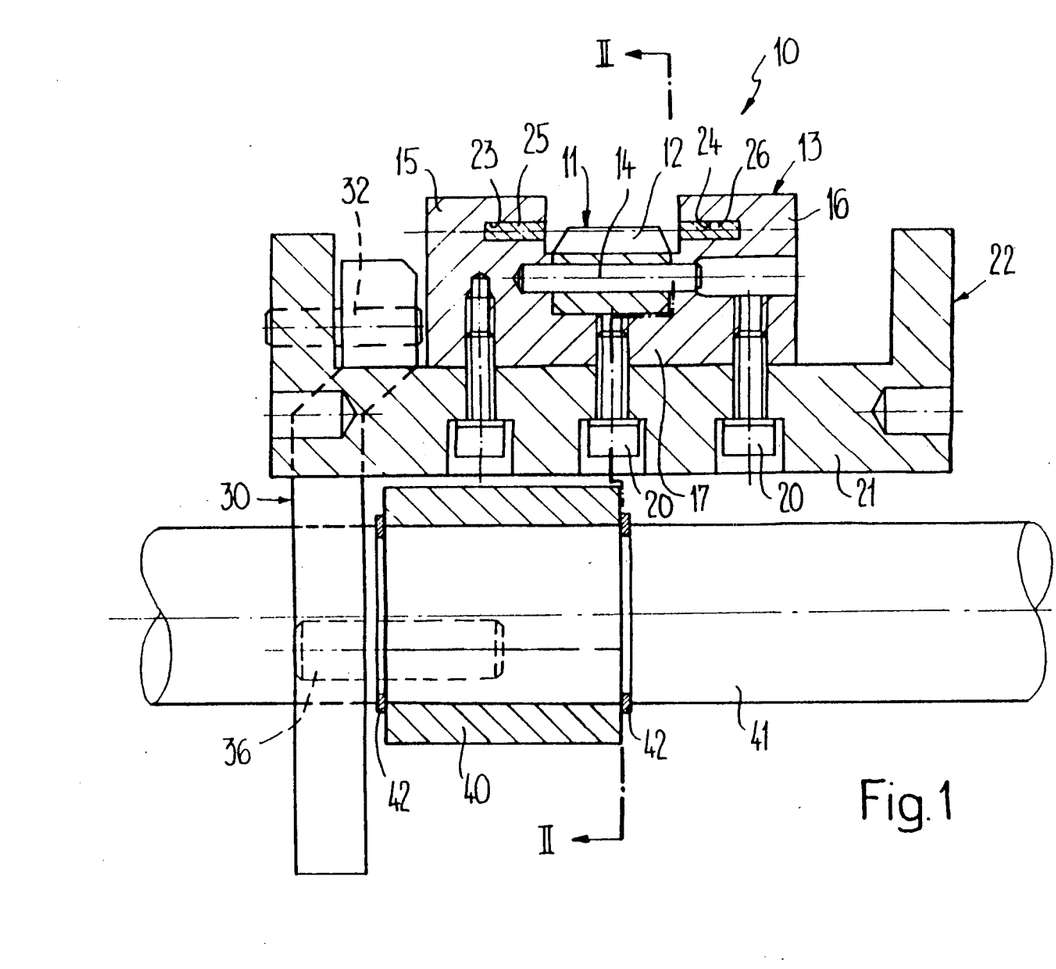
FIG. 1 is a sectional view taken along the line I—I of FIG. 2 through an externally toothed segment gear having fifteen teeth.
Figure 2:
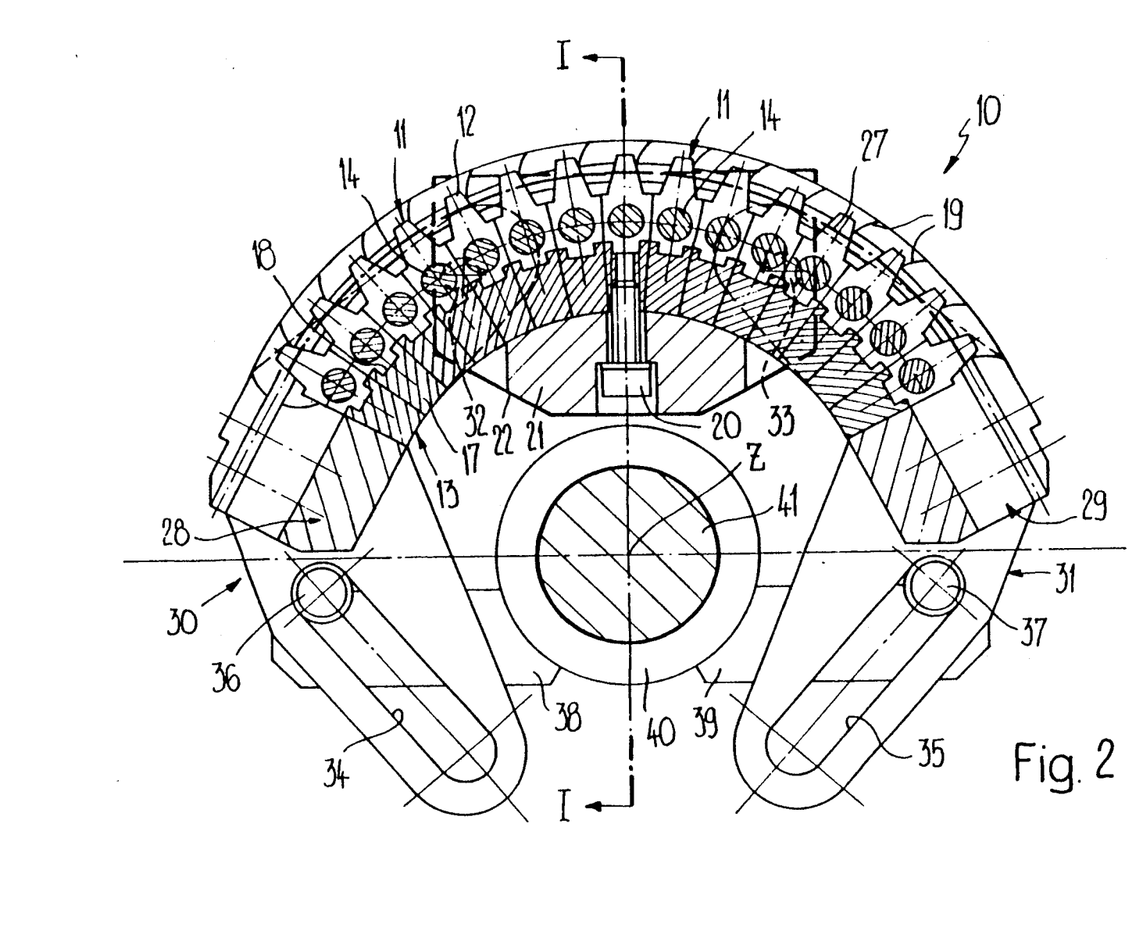
FIG. 2 is a sectional view taken along the line II—II of FIG. 1 in a position in which the radius of the circular arc described by the segment gear is at its smallest.
Figure 3:
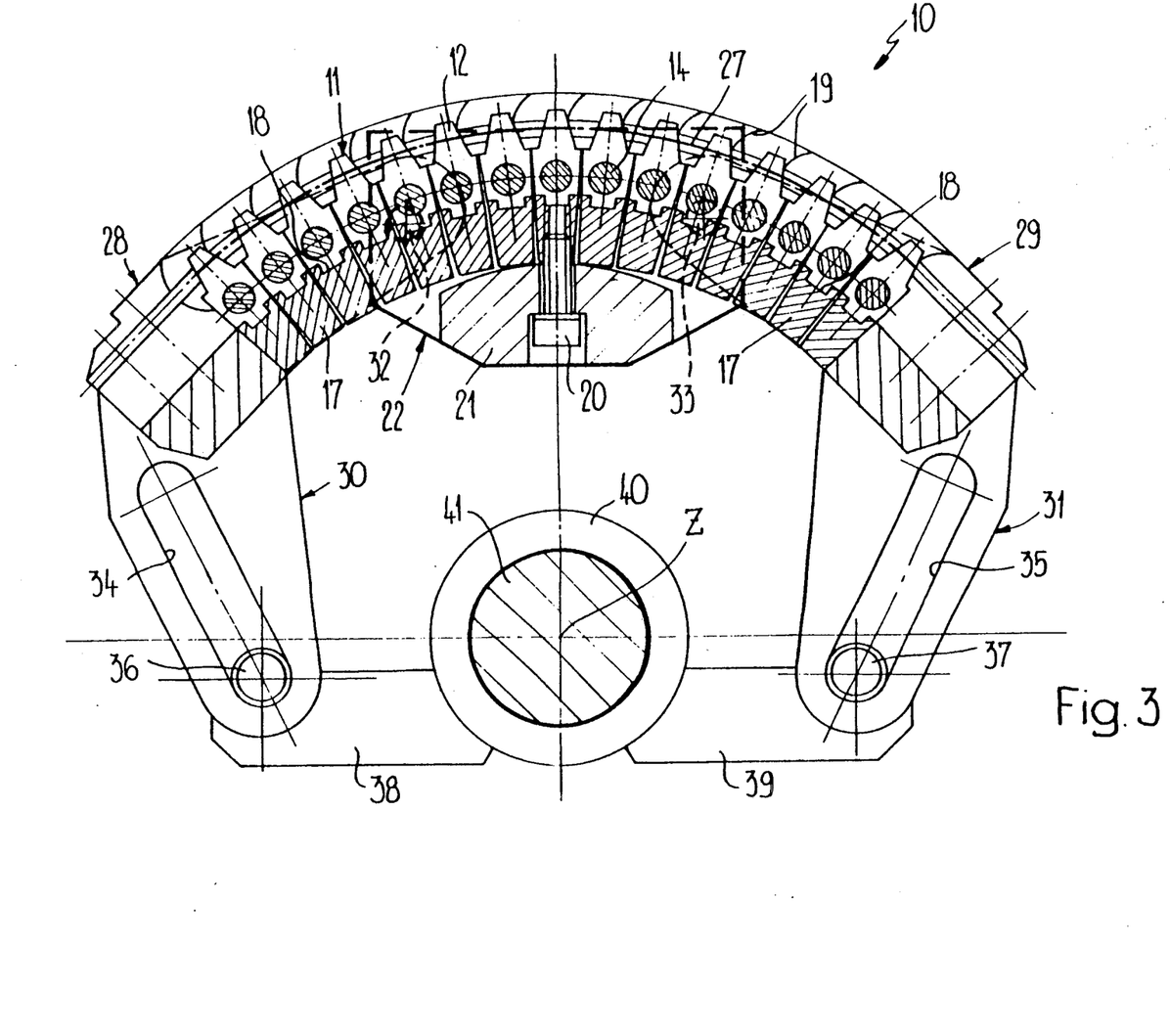
FIG. 3 is a sectional view similar to FIG. 2 but in a position in which the radius of the circular arc described by the segment gear is at its greatest.

Reference will be made first of all to FIGS. 1–3. The segment gear 10 illustrated by way of example in these figures has fifteen tooth elements 11, each of which carries a tooth 12. Each of the tooth elements 11 is anchored in a carrier part 13 which is essentially U-shaped in radial cross-section (FIG. 1). To anchor the tooth element 11 in its carrier part 13 there serves, on the one hand, a pin 14, which passes through the tooth element 11 and is anchored at its ends in the legs 15, 16 (FIG. 1) of the associated carrier part. On the other hand, as is evident from FIGS. 2 and 3 each tooth element 11 is connected at the inside of the yoke 17 of the associated carrier part 13 with a slot and key joint 18. Each tooth element 11 is thus positively anchored in all directions in the associated carrier element 13. The tooth elements can also have two or more teeth.

As can be seen in particular from FIGS. 2 and 3, the legs 15, 16 of the carrier parts 13 have side faces in the form of a sector 19 of a cylinder, allowing them to be swiveled to a limited extent relative to one another while resting face-to-face at all times. In addition, the yoke 17 of each of the carrier parts 13 has a cross-section which tapers in the manner of a wedge towards the center Z of the circular arc.

The central carrier part 13 and thus the tooth element 11 carried by it is fixed rigidly to an arm 21 of an adjusting element 22 by means of bolts 20. Further details of this adjusting element 22 will be given below.

The legs 15, 16 of the carrier parts 13 are provided on their mutually facing sides with slots 23, 24 through which a tensioned, flexible coupling element, for example in the form of a steel band 25, 26 is in each case pulled. This steel band extends approximately at the level of the pitch circle 27, indicated by chain lines in FIGS. 2 and 3, of the tooth elements 11. The ends of the steel bands 25, 26 are in each case firmly anchored in an endpiece 28, 29, against which the outermost carrier parts 13 rest snugly.

The endpieces 28, 29 each have an angle piece 30, 31 integrally formed on them and only partially visible in FIGS. 2 and 3. The invisible part of these angle pieces 30, 31 is indicated by dashes. One arm of the angle pieces 30, 31 is articulated on the adjusting element 22 by means of a gudgeon 32, 33. The other arm of the angle pieces 30, 31 is provided with an elongated hole 34, 35, a fixed pin 36, 37 engaging in each of these elongated holes 34, 35. The pins 36, 37 are each attached to the end of an arm 38, 39, these for their part starting from a sleeve 40 through which there extends a rotatable shaft 41. Spring washers 42 (FIG. 1) prevent the sleeve 40 from being displaced along the shaft 41 and the pins 36, 37 prevent a rotation of the sleeve with the shaft 41.

In accordance with the invention, adjusting means are provided for altering or varying the distances of the endpieces 28, 29 from the center Z of the circular arc and hence the radius of the segment gear and its teeth 12. As embodied, this means includes adjusting element 22 and means for moving the element as described below. If it is moved radially away from the center Z from the position shown in FIGS. 1 and 2, not only is the central tooth element 11 moved away from the center Z but, due to the interaction of the pins 36, 37 with the elongated holes 34, 35, the endpieces 28, 29 execute a swiveling movement. More specifically, and with reference to FIG. 2, endpiece 28 swivels in the clockwise direction and endpiece 29 swivels in the anti-clockwise direction. This results in an enlargement of the radius of the circular arc described by the segment gear 10, the arc length of this circular arc remaining constant, however, because of the constant length of the steel bands 25, 26 firmly anchored at both ends in the endpieces 28, 29.

A gear mechanism for which the segment gear proposed is particularly suitable is described in U.S. Pat. No. 4,843,899. The structure of the already known mechanism can be considerably simplified using the proposed segment gear. Admittedly, such a mechanism no longer has a genuinely steplessly alterable transmission ratio but this transmission ratio can be altered in so many small steps that the term "virtually" stepless still can be used.

Figure 4:
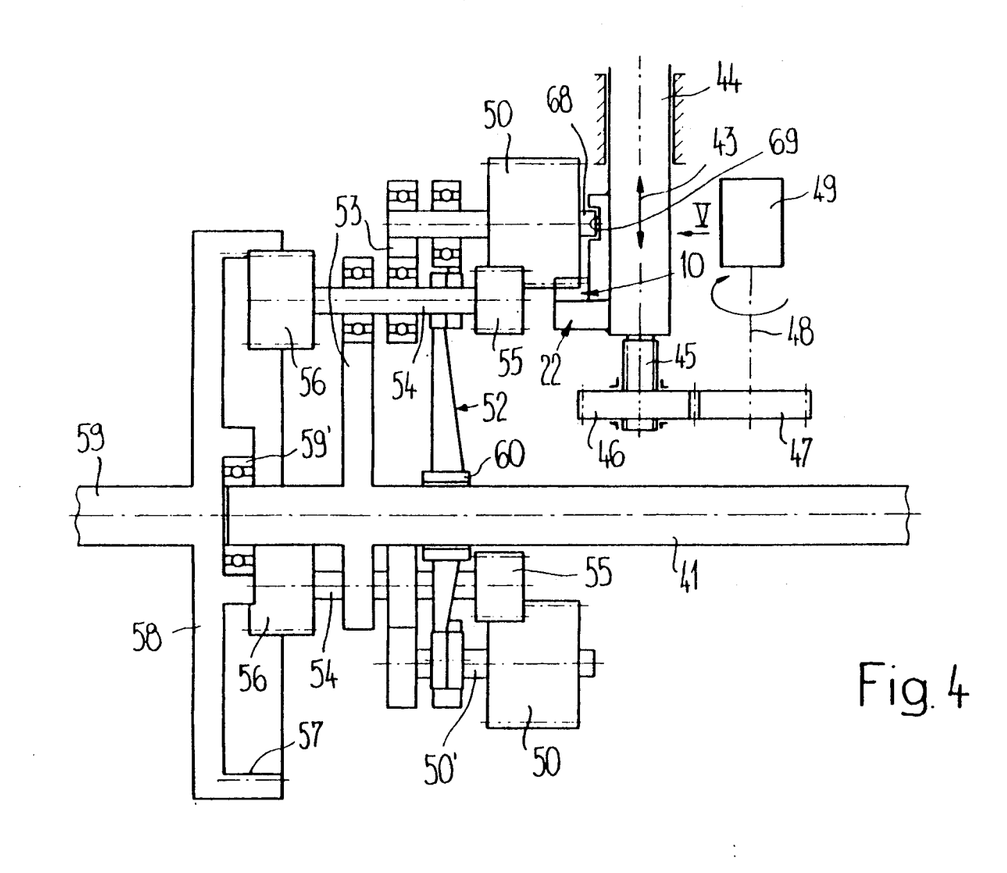
FIG. 4 is a schematic view of a mechanism, using a non-orbiting segment gear in accordance with FIGS. 1–3.
Figure 5:
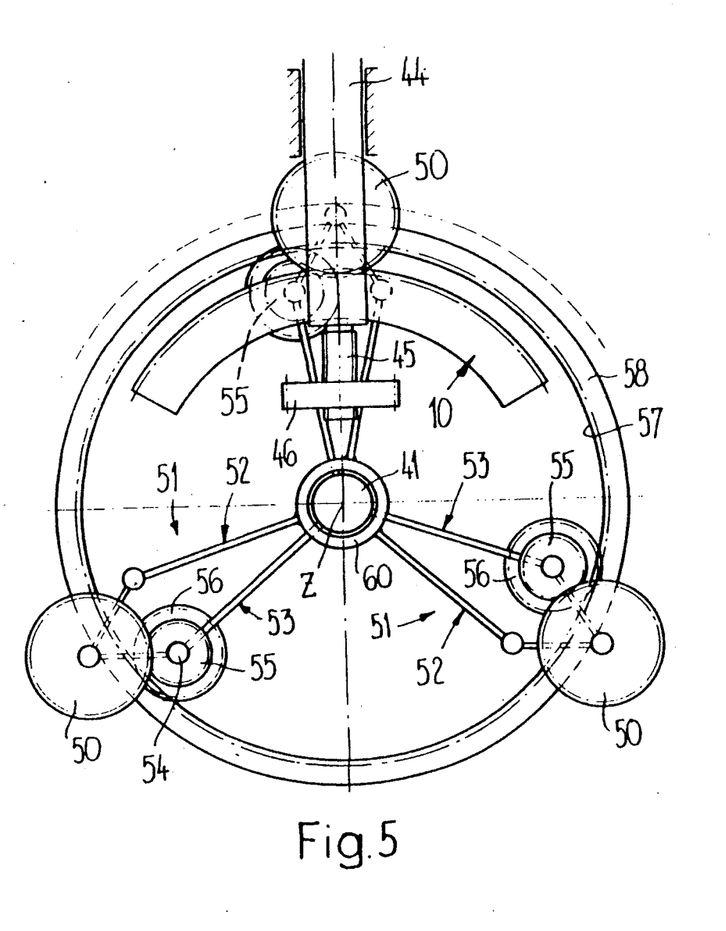
FIG. 5 is a schematic view in the direction of arrow V of the mechanism of FIG. 4, in an extreme position of the segment gear.
Figure 6:
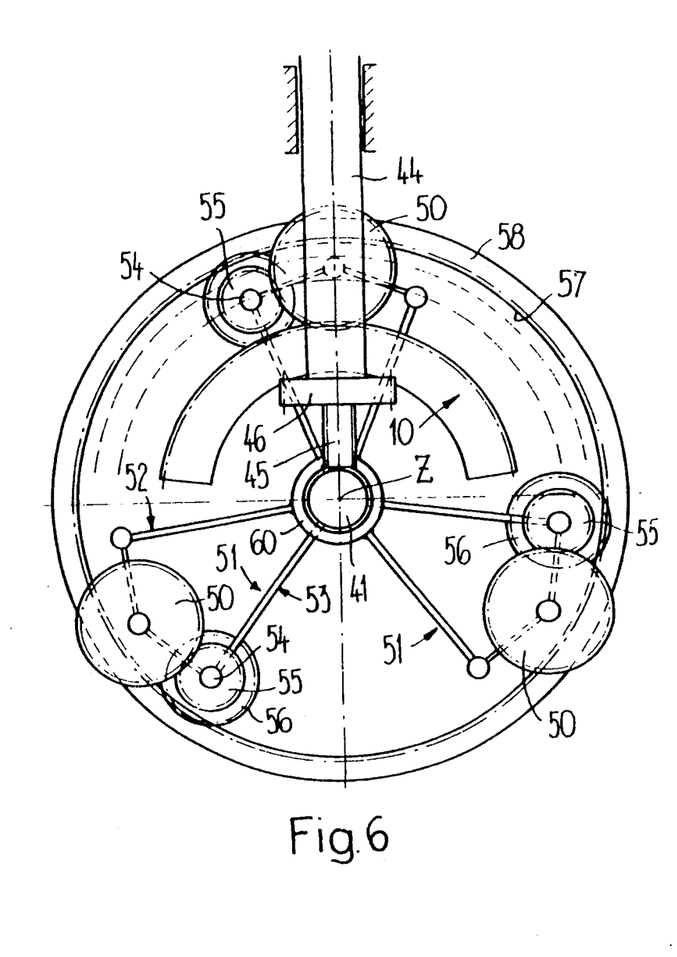
FIG. 6 is a view similar to FIG. 5, in which, however, the segment gear occupies a different extreme position.

Such a mechanism is shown schematically in FIGS. 4–6. The segment gear 10 and the adjusting element 22 associated with it can be seen in highly schematized form in FIG. 4. The adjusting element 22 is attached to a reciprocating rod 44, which is displaceable axially in accordance with the double arrow 43 and is provided at its lower end with a screw spindle 45. A rotatable but axially non-displaceable nut piece 46, which is toothed like a spur gear on the outside, cooperates with the screw spindle 45. A gear 47 which is seated on the output shaft 48 of a stepping motor 49 meshes with this nut piece 46.

One of three planet gears 50 meshes with the segment gear 10 in FIG. 4. As is evidence from FIGS. 5 and 6, these planet gears 50 are each rotatably mounted at the end of an arm 51. Each of these arms has two toggle levers 52, 53, which are identical but bent in opposite directions (FIG. 5).

Rotatably mounted in the toggle joint of each of the toggle levers 53 is a shaft 54 (FIG. 4), on one end of which a gear 55 meshing with the planet gear 50 situated at the end of the toggle lever 52, 53 and on the other end of which is further gear 56 is firmly seated. These gears 56 are in engagement with the internal toothing 57 of an output gear 58, which is rotatably mounted on the end of the shaft 41 via a ball bearing 59' and from which there starts an output shaft 59. The inner end of the toggle lever 53 is firmly connected to the shaft 41. In contrast, the inner end of the toggle lever 52 bent in the opposite direction compared to the toggle lever 53 starts from a bush 60, which is rotatably mounted on the shaft 41.

In FIG. 4, the mechanism is shown in the same position as in FIG. 5. In this position, the segment gear spans a center-angle of 120°. The circumferential distance between two planet gears 50 is likewise 120°. One of the planet gears 50 is thus always in engagement with the segment gear 10. If, by rotating the nut piece 46, the distance of the segment gear 10 from the center Z or from the axis of the shaft 41 is reduced, not only is the radius of the circular arc described by the segment gear reduced but also the planet gear 50 in engagement with said segment gear follows the segment gear 10 because a stub 68 projecting from the planet gear 50 engages in a slotted track 69 which is formed in a radially projecting extension of one leg of each of the carrier parts 13 (FIG. 1). The bend of the toggle lever 52, 53 carrying this planet gear is thereby increased and, because the toggle levers 52 on the one hand and the toggle levers 53 on the other hand are connected rigidly to one another via the bush 60 and via the shaft 41, the bend of those toggle levers whose planet gear 50 is at that moment not in engagement with the segment gear 10 increases. Let it be assumed in FIGS. 4 and 5 that the segment has a radius of 80 mm. This corresponds to a pitch diameter of 160 mm. Let a diameter of 40 mm be assumed for the planet gears 50 and a diameter of 20 mm for the gears 55. One revolution of the driveshaft 41 in the anti-clockwise direction results in the planet gears 50 executing five revolutions, namely four due to rolling contact and one due to the orbital motion (in the anti-clockwise direction) because, of course, the planet gears 50 are coupled to one another via the internal toothing 57. The five revolutions of the planet gears 50 result in seven revolutions for gears 55 and 56 in the clockwise direction (namely ten in the clockwise direction because of the engagement with the planet gear 50 minus three because of the orbital motion in the anti-clockwise direction of the gear 55 around the planet gear 50). Assuming that the transmission ratio between the gears 56 and the internal toothing 57 is 1:6, then the latter is driven two sixths or one third of a revolution in the clockwise direction.

If, on the other hand, the radius of the segment 10 is reduced to 60 mm (FIG. 6), this corresponds to a pitch diameter of 120 mm. One revolution of the shaft 41 in the anti-clockwise direction results in four revolutions in the anti-clockwise direction of the planet gears 50 (three revolutions due to rolling contact plus one because of the orbital motion). This results in five revolutions in the clockwise direction (namely eight in the clockwise direction minus three because of the orbital motion in the anti-clockwise direction) of the gears 55 and 56. Thus no rotary motion is transmitted to the internal toothing 57 and the output shaft 59 remains stationary.

The adjustment of the transmission ratio of the mechanism described above can also be performed during operation but is to be carried out at that moment in which only one of the planet gears 50 is in engagement with the segment 10 and in a step which corresponds to an increase (or reduction) of the teeth of the gear simulated by the segment 10 by one unit.

Figure 7:
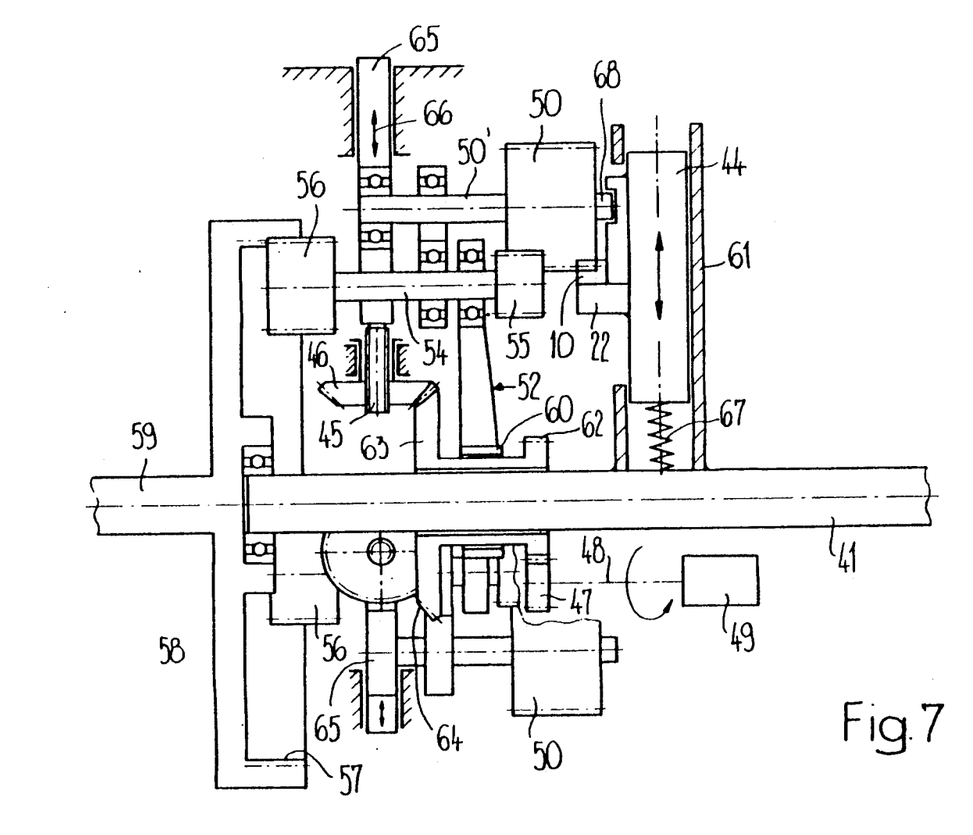
FIG. 7 is a schematic view similar to FIG. 4 of a mechanism in which the segment gear orbits.

The mechanism shown in FIG. 7 is as it were the inverse of that in FIGS. 4–6. Here the segment gear 10 orbits since the reciprocating rod 44 is displaceable in a guide tube 61 firmly connected to the shaft 41. The planet gears 50 do not orbit. The adjustment of the segment gear 10, i.e., the alteration of its distance from the axis of the shaft 41 is performed indirectly, again however by the stepping motor 49. Its output gear 47 is in engagement with the spur toothing 62 of a double gear 63 rotatably mounted on the shaft and on the hub of which the bush 60 is rotatably mounted. The other toothing of the double gear 63 is a bevel toothing 64, which is in continuous engagement with the nut piece 46, here likewise bearing a bevel toothing. Three nut pieces 46 are present here. Nut piece 46 acts via the screw spindle 45 on a reciprocating rod 65, which is displaceable in fixed guides in accordance with the double arrow 66. Mounted in the reciprocating rod 65 is the shaft 50' of the planet gear 50, the distance of which from the axis of the shaft 41 can be altered by this means. The segment gear 10 follows the respective position of the planet gears 50, for example by the action of a compression spring 67.

I claim:

1. A variable radius segment gear in the form of a circular arc comprising a plurality of individual tooth elements arranged in succession each carrying at least one gear tooth and at least one tensioned, flexible coupling element holding together said elements in a circular arc and being anchored at each of its ends in an endpiece, and adjusting means for altering the distance of the endpieces from the center of the circular arc and hence the radius of the segment gear.

2. The segment gear of claim 1, wherein each tooth element is anchored in a carrier part and the carrier parts are held together by the coupling element.

3. The segment gear of claim 2, wherein the carrier parts are U-shaped and have two legs and wherein one tooth element is anchored between each of the two legs of a carrier part.

4. The segment gear of claim 3, wherein two coupling elements are provided, each of these coupling elements passing through one of the legs of each of the carrier parts at the level of the pitch circle of each of the tooth elements.

5. The segment gear of claim 1, wherein each endpiece is attached to an angle piece having two arms, one arm of which is articulated on an adjusting element displaceable radially relative to the center of the circular arc, while the other arm is provided with an elongated hole into which there engages a pin fixed relative to the center of the circular arc.

6. The segment gear of claim 5, wherein the adjusting element is rigidly connected to the central tooth element of the plurality of tooth elements.

7. The segment gear of claim 2, wherein each tooth element is secured with a key and slot fit in the associated carrier part.

8. The segment gear of claim 3, wherein each tooth element is secured between the legs of its associated carrier part with a pin.

9. The segment gear of claim 1, wherein the coupling element is a steel band.

10. A gear mechanism with an adjustable transmission ratio, having a set of planet gears and at least one segment gear of claim 1, wherein the planet gears and the segment gear orbit relative to one another with at least one planet gear always in engagement with the segment gear, and a gear train leading to an output gear that starts from each planet gear, and means for adjusting the distance of the endpieces of the segment gear from the center of the circular arc.

11. The gear mechanism of claim 10, wherein each endpiece is attached to an angle piece having two arms, one arm of which is articulated on an adjusting element displaceable radially relative to the center of the circular arc, while the other arm is provided with an elongated hole into which there engages a pin fixed relative to the center of the circular arc, each of the pins being attached to an arm starting from a sleeve mounted on a shaft whose axis leads through the center of the circular arc.

12. The gear mechanism of claim 10, wherein each planet gear is mounted at one end of an arm which is in the form of two to levers which are identical but bent in opposite directions, a gear in engagement with the planet gear being rotatably mounted in the toggle joint of the one toggle lever and the other end of the one toggle lever being firmly connected to a driveshaft while the other end of the other toggle lever starts from a bush rotatably mounted on the driveshaft.

13. The gear mechanism of claim 10, wherein the adjusting means includes a screw spindle.

14. The gear mechanism of claim 13, wherein a stepping motor is provided for actuating the screw spindle.

* * * * *

UNITED STATES PATENT AND TRADEMARK OFFICE
CERTIFICATE OF CORRECTION

PATENT NO. : 5,044,219

DATED : September 3, 1991

INVENTOR(S) : Hans G. BRAUNSCHWEILER et al.

It is certified that error appears in the above-identified patent and that said Letters Patent is hereby corrected as shown below:

Claim 12, column 6, line 27, change "to" to --toggle--.

Signed and Sealed this

Fifth Day of January, 1993

Attest:

DOUGLAS B. COMER

*Attesting Officer*   Acting Commissioner of Patents and Trademarks